United States Patent [19]

Shimizu et al.

[11] Patent Number: 4,670,517

[45] Date of Patent: Jun. 2, 1987

[54] NOVEL ISONITRILE GROUP-CONTAINING POLYMERS AND PROCESS FOR PREPARING THE SAME

[75] Inventors: Kiyoshi Shimizu; Tadao Endo, both of Koriyama; Susumu Harada, Tokyo, all of Japan

[73] Assignee: Nitto Boseki Co., Ltd., Fjukushim A, Japan

[21] Appl. No.: 849,414

[22] Filed: Apr. 8, 1986

[30] Foreign Application Priority Data

Apr. 9, 1985 [JP] Japan .................................. 60-74999

[51] Int. Cl.$^4$ .............................................. C08F 8/32
[52] U.S. Cl. ............................. 525/328.2; 525/359.1; 525/359.3; 525/359.4; 525/366; 526/310
[58] Field of Search ...................... 525/328.2; 526/310

[56] References Cited

U.S. PATENT DOCUMENTS

| | | | |
|---|---|---|---|
| 2,456,428 | 12/1948 | Parker | 525/328.2 |
| 3,977,983 | 8/1976 | Tsuneda | 525/328.2 |
| 4,121,986 | 10/1978 | Battaerd | 526/310 |
| 4,260,714 | 4/1981 | Wingard, Jr. | 515/328.2 |
| 4,369,232 | 1/1983 | Scopazzi | 525/328.2 |
| 4,559,391 | 12/1985 | Veda et al. | 525/328.2 |
| 4,604,451 | 8/1986 | Harada et al. | 525/328.2 |
| 4,609,716 | 9/1986 | King et al. | 526/310 |
| 4,626,577 | 12/1986 | Harada | 526/310 |

*Primary Examiner*—Joseph L. Schofer
*Assistant Examiner*—Bernard Lipman
*Attorney, Agent, or Firm*—Bert J. Lewen; Henry Sternberg

[57] ABSTRACT

A novel isonitrile group-containing polymer free of the problem of bad odor inherent in isonitrile compounds is obtained by making use of carbylamine reaction which is now abandoned as means for the synthesis of low-molecular isonitrile compounds.

5 Claims, 2 Drawing Figures

NOVEL ISONITRILE GROUP-CONTAINING POLYMERS AND PROCESS FOR PREPARING THE SAME

BACKGROUND OF THE INVENTION

This invention relates to a novel isonitrile group-containing polymer produced by converting amino group of polyallylamine into isonitrile group, and a process for preparing such polymer.

Isonitrile compounds (R—NC) are the only group of compounds which exist in a neutral state and with safety among the compounds of the type having a lone pair (or pairs) of electrons on the carbon atom. This group of compounds are noted for their various interesting and certainly useful properties owing to the specific structure of isonitrile group (—NC). The fact is to be noted, for instance, that many of the naturally occurring materials exhibiting physiological activities such as bactericidal activity, algicidal activity, insecticidal activity, etc., are the isonitrile compounds. Further, isonitrile group form complexes with heavy metals and it is supposed that these complexes, at least some of them, will prove effective as a catalyst for various chemical reactions.

In spite of these copious attractive properties of isonitrile compounds, no successful industrial synthesis of these compounds for said particular uses has been reported.

This is attributed, among other things, to the faults of the conventional techniques for the synthesis of isonitrile compounds and the fact that the low-molecular isonitrile compounds are an awfully stenchy and volatile substance.

SUMMARY OF THE INVENTION

In an effort for eliminating such conventional problems, especially bad odor or low-molecular isonitrile compounds, the present inventors conceived the idea of producing high-molecular isonitrile compounds and, by selecting polyallylamine as starting material, have attempted isonitrification of this material by using a known method involving in its reaction process the step of forming N-substituted formamide (see I. Ugi, U. Fetzer, U. Eholzer, H. Knupfer and K. Offerman: Angrew. Chem. 77, 492 (1965)) which is considered the best method for the synthesis of low-molecular isonitrile compounds. The reaction process of this method is as follows:

1st step

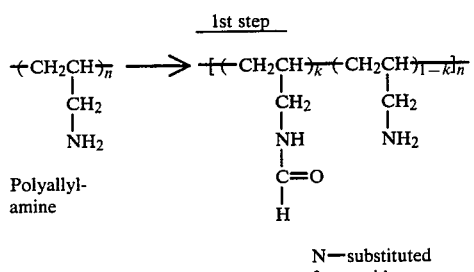

Polyallyl-amine

N—substituted formamide

2nd step

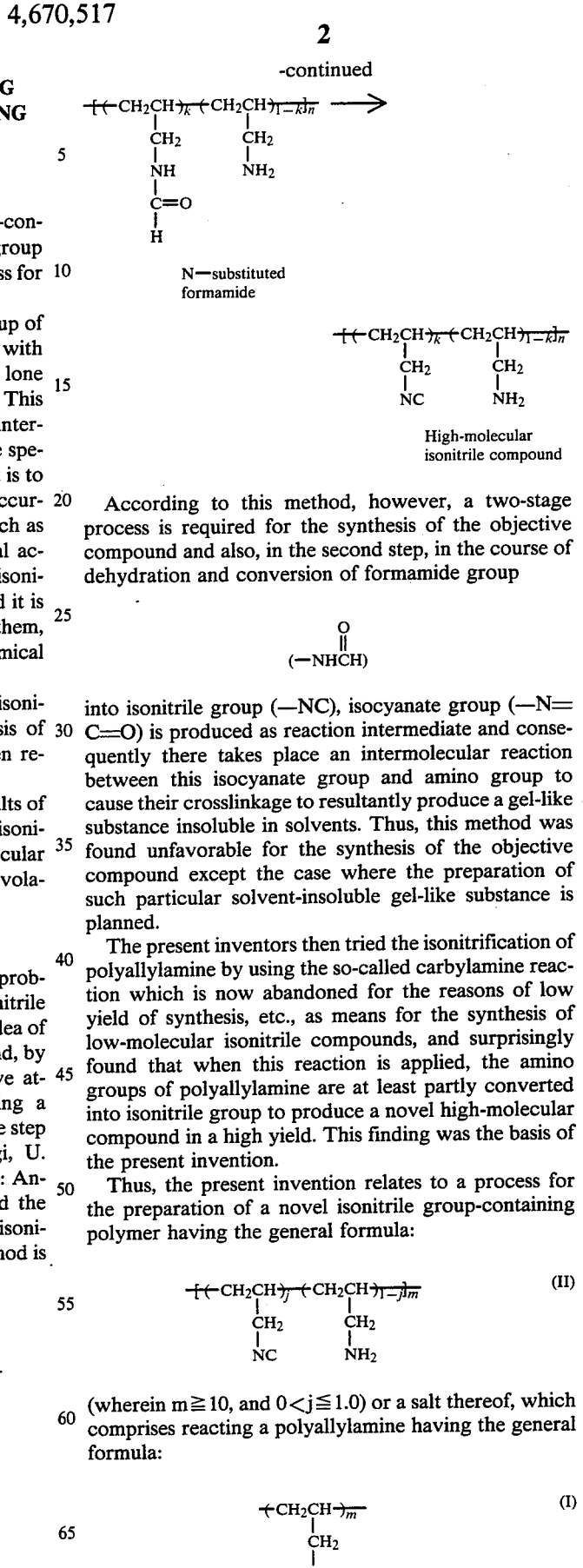

According to this method, however, a two-stage process is required for the synthesis of the objective compound and also, in the second step, in the course of dehydration and conversion of formamide group $$(-NH\overset{O}{\overset{\|}{C}}H)$$

into isonitrile group (—NC), isocyanate group (—N=C=O) is produced as reaction intermediate and consequently there takes place an intermolecular reaction between this isocyanate group and amino group to cause their crosslinkage to resultantly produce a gel-like substance insoluble in solvents. Thus, this method was found unfavorable for the synthesis of the objective compound except the case where the preparation of such particular solvent-insoluble gel-like substance is planned.

The present inventors then tried the isonitrification of polyallylamine by using the so-called carbylamine reaction which is now abandoned for the reasons of low yield of synthesis, etc., as means for the synthesis of low-molecular isonitrile compounds, and surprisingly found that when this reaction is applied, the amino groups of polyallylamine are at least partly converted into isonitrile group to produce a novel high-molecular compound in a high yield. This finding was the basis of the present invention.

Thus, the present invention relates to a process for the preparation of a novel isonitrile group-containing polymer having the general formula:

$$-(\text{CH}_2\text{CH})_{\overline{j}}-(\text{CH}_2\text{CH})_{\overline{1-j}})_{\overline{m}} \quad \text{(II)}$$
$$\quad | \quad\quad\quad\quad | $$
$$\text{CH}_2 \quad\quad \text{CH}_2$$
$$\quad | \quad\quad\quad\quad |$$
$$\text{NC} \quad\quad \text{NH}_2$$

(wherein $m \geq 10$, and $0 < j \leq 1.0$) or a salt thereof, which comprises reacting a polyallylamine having the general formula:

$$-(\text{CH}_2\text{CH})_{\overline{m}} \quad \text{(I)}$$
$$\quad |$$
$$\text{CH}_2$$
$$\quad |$$
$$\text{NH}_2$$

(wherein $m \geq 10$) or a salt thereof in the presence of a carbylamine reaction agent, for example, a haloform (such as chloroform or bromoform) or a trichloroacetate (such as sodium trichloroacetate), and an alcohol solution of a strongly basic material.

The present invention is also envisaged to provide a novel isonitrile group-containing polymer having the above-shown general formula (I) or a salt thereof.

DESCRIPTION OF THE PREFERRED EMBODIMENTS

Figure 1:
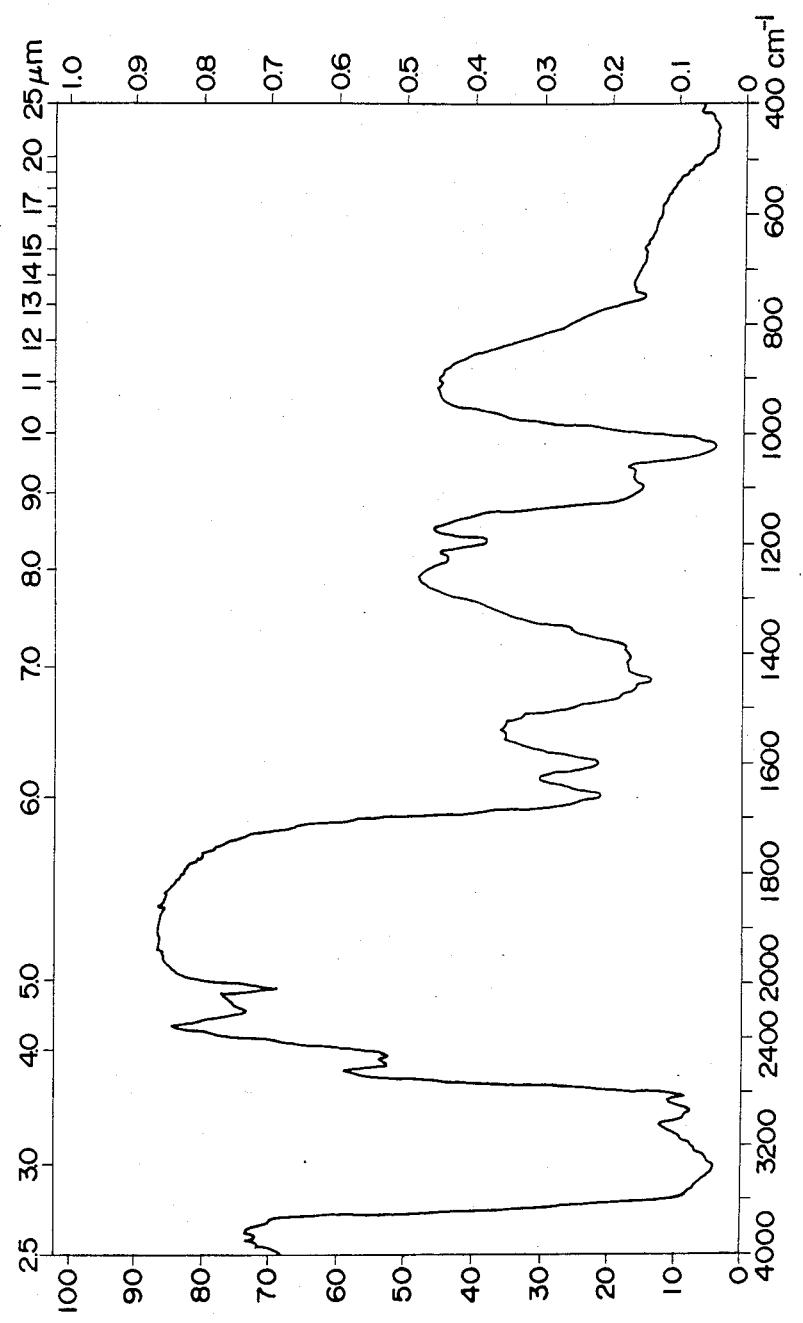
FIG. 1 is an infrared absorption spectrum of an isonitrile group-containing polymer according to this invention.

The process for preparing the novel isonitrile group-containing polymer in accordance with this invention is described in more detail below.

Initially, an alcohol solution of a strongly basic material (such as caustic alkali, e.g. sodium hydroxide) is prepared, this solution being designated as solution (A). Separately, a specified haloform such as chloroform or bromoform (this may be replaced with sodium trichloroacetate or the like) is added to an alcohol solution of polyallylamine to prepare a solution (B). Then this solution (B) is added dropwise to solution (A). Since the reaction which follows is a tremendously exothermic reaction, the addition rate must be adjusted so as to maintain the reaction system at 50°-70° C., preferably below 65° C. After said dropwise addition, the reaction is further continued for 4-8 hours with the reaction system maintained at 50°-75° C., preferably below 65° C. After this reaction, the reaction system is cooled, followed by the removal of precipitated inorganic salts such as potassium chloride, and if necessary the solution is concentrated under reduced pressure to a predetermined concentration to obtain an alcohol solution of an isonitrile group-containing polymer of formula (II). Then the thus obtained alcohol solution of polymer (II) is treated in an ordinary way (for example, alcohol is distilled off to dry the solution) to obtain the pure form of polymer (II).

The strongly basic material used for the preparation of solution (A) is not limited to inorganic bases such as potassium hydroxide, sodium hydroxide and the like; it is also possible to use other bases such as sodium or potassium alcoholates, for example, potassium t-butylate, sodium methylate and the like.

In prosecuting the reaction, solution (A) may be added to solution (B).

An example of preparation process of said novel isonitrile group-containing polymer is shown below by way of reaction formula. (It should be noted that the formula is not expressed stoichiometrically).

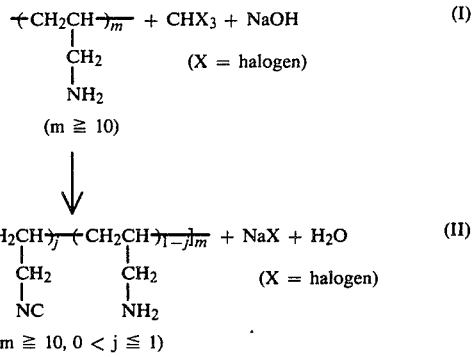

A further detailed description of the novel isonitrile group-containing polymers of this invention regarding their properties and other specificities is given below.

As stated above, the novel isonitrile group-containing polymers of this invention are represented by the general formula (II). In the formula, m is defined as a number of 10 or greater. This is based on the inference that if m is less than 10, the product will not be provided with the characteristic properties of high-molecular compounds and not be freed of unbearably bad odor possesed by said low-molecular compounds. This inference is based on the following facts.

It is actually very difficult to produce a polyallylamine of an extremely low degree of polymerization with m less than 10, so the discussion is here made regarding isonitriles prepared by selecting alkylamine as the substitute model compound and subjecting it to carbylamine reaction. The isonitrile compounds with an alkyl group carbon number of around 10 (corresponding substantially to $m=1-3$ in the formula (II)), which are in the form of liquid as they ordinarily are, give out a quite unbearable stench even if they exist only in a trace amount of the ppb order. However, those with a carbon number of around 30-40 (corresponding substantialy to $m=8-15$ in the formula (II)) are appreciably lessened in their offensive smell to a degree which is somehow bearable when they exist in a small amount of the ppm order. Further, those with a carbon number of around 100 (corresponding substantially to $m=30$ in the formula (II)) smell only faintly and give no much nuisance even if they exist in the form of a solution with such a high concentration as 20 to 30%, and when in the form of solid, they emit almost no perceivable malodor. The above inference is based on these experimental facts. Therefore m is preferable to be 30 or more, especially from 30 to 1,000. Further the number j in the formula (II) is preferable to be 0.2 to 0.8, especially 0.4 to 0.6.

The isonitrile group-containing polymer of formula (II) is usually obtained in the form of an alcohol solution, and it can be properly diluted with water or other solvents. In any form, the polymer is almost free of malodor which the low-molecular isonitrile compounds have. Further, this resin undergoes no insolubilization and decomposition reaction due to crosslinkage and remains stable even if it is kept for a long time in the form of an alcohol solution. It is also possible to obtain a pure form of isonitrile group-containing polymer of formula (II) from its alcohol solution by a conventional method as mentioned before.

The present invention is further described below by way of the examples thereof and a referential example, but it will be understood that these examples are illustrative and give no limitation to the scope of the invention.

First, an example of preparation of polyallylamine used as starting material for the preparation of the novel isonitrile group-containing polymer of this invention is shown as a referential example.

REFERENTIAL EXAMPLE

Polyallylamine was prepared in the following way from polyallylamine hydrochloride synthesized according to the method of Japanese Patent Laid-Open No. 201811/83.

247 g of potassium hydroxide and 2,400 g of methanol were supplied into a 3-liter three-necked flask provided with a stirrer, a thermometer and a reflux condenser, and the former is dissolved in the latter. Then 347 g of polyallylamine hydrochloride (having an average molecular weight of approximately 10,000) was dispersed therein and the mixture was reacted at 40° C. for 24 hours. After the reaction, the system was cooled, followed by the removal of produced potassium chloride, and the remaining solution was concentrated under reduced pressure to obtain a 12.4% methanol solution of polyallylamine. Separately, the same operations were carried out by using ethanol in place of methanol to obtain a 10.8% ethanol solution of polyallylamine. These two solutions were used in the examples described below, but in part of the examples there was used a solution obtained by passing a 20% aqueous solution of polyallylamine through a strongly basic ion exchange resin to prepare an aqueous solution of polyallylamine, freeze-drying the same to obtain a pure form of polyallylamine and dissolving it in alcohol.

Shown below are the examples of preparation processes of the novel isonitrile group-containing polymers according to this invention.

Example 1

A solution formed by dissolving 52.1 g of potassium hydroxide in 174 g of methanol was poured into a 1 liter three-necked flask provided with a stirrer, a dropping funnel and a thermometer. Into this solution was added dropwise a separately prepared solution, that is, a solution formed by mixing 46.5 g of chloroform in 100 g of a 12.4% methanol solution of polyallylamine, over a period of 20 minutes. Since the temperature rises in the course of said dropwise addition, the system was cooled with water to keep it at 60°–65° C. After this dropwise addition, the reaction was allowed to further continue by stirring the solution at 60° C. for 8 hours. After the reaction, the system was cooled, the produced precipitate was removed, and the filtrate was concentrated under reduced pressure to a total amount of about 300 ml, whereby a methanol solution of the polymer of formula (II) (solid content: 7.0%) was obtained.

Figure 2:
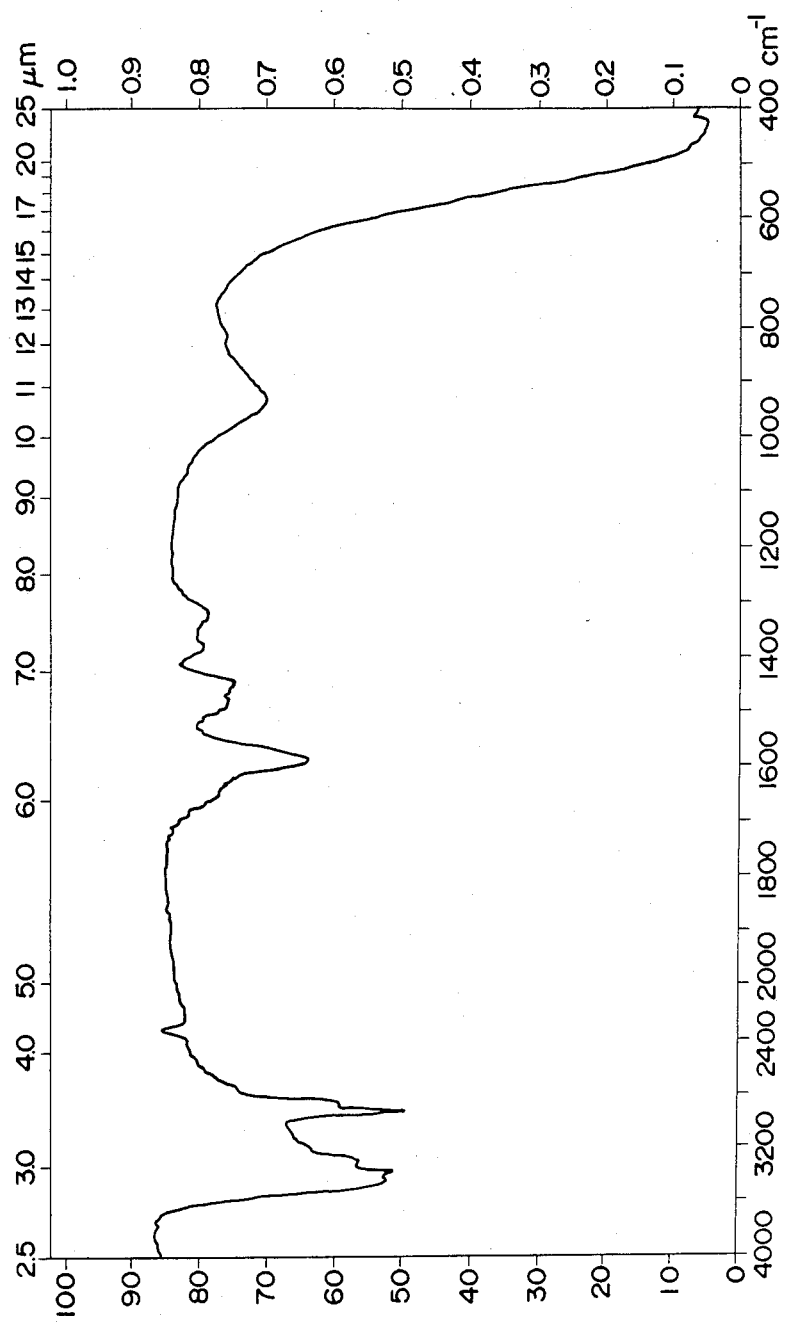
FIG. 2 is an infrared absorption spectrum of polyallylamine used as starting material for the preparation of isonitrile group-containing polymer according to this invention.

The infrared absorption spectrum taken of the obtained methanol solution of the polymer of formula (II) was as shown in FIG. 1. As noted from the comparison of this spectrum with the infrared absorption spectrum of the methanol solution of polyallylamine shown in FIG. 2, the spectrum of FIG. 1 showed a characteristic absorption due to isonitrile group (—NC) in the region of 2,050–2,250 cm$^{-1}$, beside the characteristic absorption seen in the spectrum of FIG. 2. Also, when the system made by adding 50 ml of water to about 0.2 g of said methanol solution was subjected to neutralization titration for determining the residual amino groups, it was found that the —NC:—NH$_2$ ratio was 1.02:1.00.

The foregoing results confirmed that the obtained polymer had the following structure:

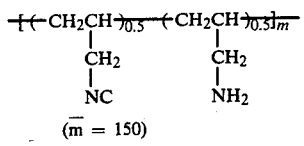

($\overline{m}$ = 150)

The obtained polymer was a white powder tinged with light yellow and having no bad odor, and it began to decompose on heating to 150° C.

Example 2

20.0 g of potassium hydroxide and 90 g of ethanol were supplied into and dissolved to form a solution in a 300-liter three-necked flask provided with a stirrer, a dropping funnel and a thermometer. Into this ethanol solution of potassium hydroxide was added dropwise another solution prepared by adding 17.8 g of chloroform to a solution of 4.75 g of polyallylamine in 95 g of ethyl alcohol. The reaction temperature, reaction time and succeeding treating operations were the same as in Example 1.

The infrared absorption spectrum of this ethanol solution demonstrated the presence of a characteristic absorption band due to isonitrile group at 2,050–2,200 cm$^{-1}$, beside the absorption seen in the infrared absorption spectrum of the ethanol solution of polyallylamine. The —NC:—NH$_2$ ratio as determined in the same way as in Example 1 was 1.30:1.00.

These results confirmed that the obtained polymer had the following structure.

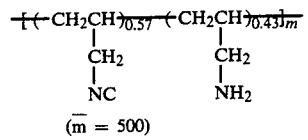

($\overline{m}$ = 500)

The obtained polymer was a white powder tinged with light yellow and having no bad odor, and it began to decompose on heating to 150° C.

Example 3

180 g of a 28% methanol solution of sodium methylate was poured into a 500 ml three-necked flask provided with a stirrer, a dropping funnel, a reflux condenser and a thermometer. Separately a solution was prepared by mixing 46.5 g of chloroform in 100 g of a 12.4% methanol solution of polyallylamine, and this solution was added dropwise to said methanol solution of sodium methylate over a period of 25 minutes. Since this dropwise addition causes a rise of system temperature, care was taken to keep the system at 50°–60° C.

After said dropwise addition, the reaction was further continued at 60° C. for 8 hours and then the system was cooled. The produced sodium chloride was filtered out and the filtrate was concentrated under reduced pressure.

The infrared absorption spectrum of this methanol solution was identical to the infrared absorption spectrum of the methanol solution obtained in Example 1. The —NC:—NH$_2$ ratio determined in the same way as in Example 1 was 1.2:1.0.

The above results confirmed that the obtained polymer had the following structure.

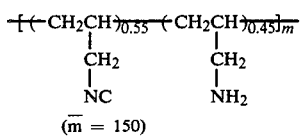

(m̄ = 150)

The obtained polymer was a white powder tinged with light yellow and having no bad odor. It began to decompose upon heating to 150° C.

Example 4

A solution of 52.1 g of potassium hydroxide in 200 ml of methanol was poured into a 500 ml three-necked flask provided with a stirrer, a dropping funnel, a reflux condenser and a thermometer. Separately, a solution was prepared by mixing 98.4 g of bromoform in 100 g of a 12.4% methanol solution of polyallylamine, and this solution was added dropwise to said methanol solution of potassium hydroxide over a period of 30 minutes. The reaction temperature, reaction time and after-treatments were the same as in Example 1.

From the —NC:—NH$_2$ ratio (0.89:1.0) determined from the infrared absorption spectrum of the obtained methanol solution and the determination of residual amino groups, it was confirmed that the obtained polymer had the following structure.

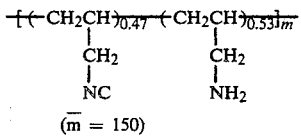

(m̄ = 150)

The obtained polymer was a white powder tinged with light yellow and having no bad odor, and it began to decompose upon heating to 150° C.

Example 5

Polyallylamine hydrochloride was fractionated by a known method to obtain a fraction A having a molecular weight of about 5,000 (m=50 in the formula (I)), a fraction B having a molecular weight of about 20,000 (m=200) and a fraction C having a molecular weight of about 100,000 (m=1,000).

These fractions were desalted in the usual way to prepare three 12.4% methanol solutions of polyallylamine (solution A, solution B and solution C).

These three methanol solutions were treated in the completely same way as in Example 1 except that the operations were conducted on a 1/10 scale of Example 1 to obtain the corresponding methanol solution of polyisonitrile (II).

Any of these solutions was almost free of the malodor inherent in the methanol solutions of low-molecular isonitriles.

As mentioned above, according to the present invention, a novel isonitrile group-contaning polymer free of the problem of bad odor inherent in isonitrile compounds is obtained by making use of carbylamine reaction which is now abandoned as means for the synthesis of low-molecular isonitrile compounds.

The isonitrile group-containing polymer is expected to be used for a heavy metal-capturing agent, a chemical reaction catalyst and other miscellaneous uses due to its presence of the isonitrile group.

What is claimed is:

1. An isonitrile group-containing polymer having the general formula:

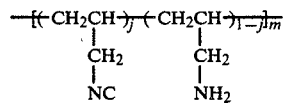

wherein m≧10, and 0<j≦1.0 or a salt thereof.

2. An isonitrile group-containing polymer according to claim 1, wherein m is 30 or more.

3. An isonitrile group-containing polymer according to claim 2, wherein m is from 30 to 1,000.

4. An isonitrile group-containing polymer according to claim 1, wherein j is from 0.2 to 0.8.

5. An isonitrile group-containing polymer according to claim 4, wherein j is from 0.4 to 0.6.

* * * * *